US005800305A

United States Patent [19]

Ra

[11] Patent Number: 5,800,305
[45] Date of Patent: Sep. 1, 1998

[54] REDUCTION GEAR WITH COAXIAL INPUT AND OUTPUT SHAFTS AND COMBINING PLANETARY AND NONPLANETARY GEARING

[75] Inventor: Jong-Oh Ra, Seoul, Rep. of Korea

[73] Assignee: Koon-Woo Kang, Seoul, Rep. of Korea; a part interest

[21] Appl. No.: 780,141

[22] Filed: Dec. 26, 1996

[30]  Foreign Application Priority Data

Dec. 29, 1995 [KR] Rep. of Korea ............................. 65777
Dec. 29, 1995 [KR] Rep. of Korea ............................. 65778

[51] Int. Cl.$^6$ ................................................. F16H 57/08
[52] U.S. Cl. ............................ 475/343; 475/331; 475/903
[58] Field of Search .......................... 475/219, 331, 475/338, 343, 903, 329, 330

[56]  References Cited

U.S. PATENT DOCUMENTS

5,171,194  12/1992  Shen ........................................ 475/330

*Primary Examiner*—Charles A. Marmor
*Assistant Examiner*—Ankur Parekh
*Attorney, Agent, or Firm*—Michaelson & Wallace; Peter L. Michaelson; Michael P. Straub

[57]  ABSTRACT

A reduction gear can provide a relatively large reduction gear ratio by changing the number of gear teeth but without increasing the number of gears, thereby simplifying the structure thereof. The power transmission flow in the reduction gear occurs as follows. In one embodiment, power simultaneously flows to both a first sun gear and to a second sun gear. From the first sun gear, power flows through, in succession, a planetary gear, a ring gear, a carrier and finally to an output ring gear and output shaft. From the second sun gear, power successively flows through a first differential gear and a second differential gear to the output ring gear and the output shaft. In another embodiment, power flows, in succession, through an input sun gear, a first differential gear and a second differential gear, to simultaneously both a differential sun gear and to a differential ring gear. From the differential sun gear and the differential ring gear power is transferred to a planetary sun gear and a planetary ring gear, respectively, which both, in turn, feed power to a planetary gear. The planetary gear feeds power to carriers which, in turn, transfer power to an output shaft.

4 Claims, 6 Drawing Sheets

REDUCTION GEAR WITH COAXIAL INPUT AND OUTPUT SHAFTS AND COMBINING PLANETARY AND NONPLANETARY GEARING

BACKGROUND OF THE INVENTION

1. Field of the Invention

The present invention relates to a reduction gear and, more particularly, to a reduction gear, which can remarkably reduce rotational speed of an input shaft and transmit it to an output shaft.

2. Discussion of Related Art

It has long been known that a conventional reduction gear is designed such that the rotational speed is reduced within a limited range in accordance with the number of gear teeth. Therefore, to obtain a relatively large reduction gear ratio, the number of gear teeth should be increased, or a cycloid reduction gear, which is very expensive, should be used.

In addition, it is very difficult to mount the input and output shafts on the same axis, requiring a large space to mount and increasing manufacturing costs.

SUMMARY OF THE INVENTION

Therefore, the present invention has been made in an effort to solve the above described problems of the prior art.

It is an object of the present invention to provide a reduction gear which can obtain a relatively large reduction gear ratio only by changing the number of gear teeth without increasing the number of gears, thereby simplifying the structure thereof.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Referring first to FIGS. 1 to 5, there are shown views illustrating a reduction gear according to a first embodiment of the present invention.

Figure 1:
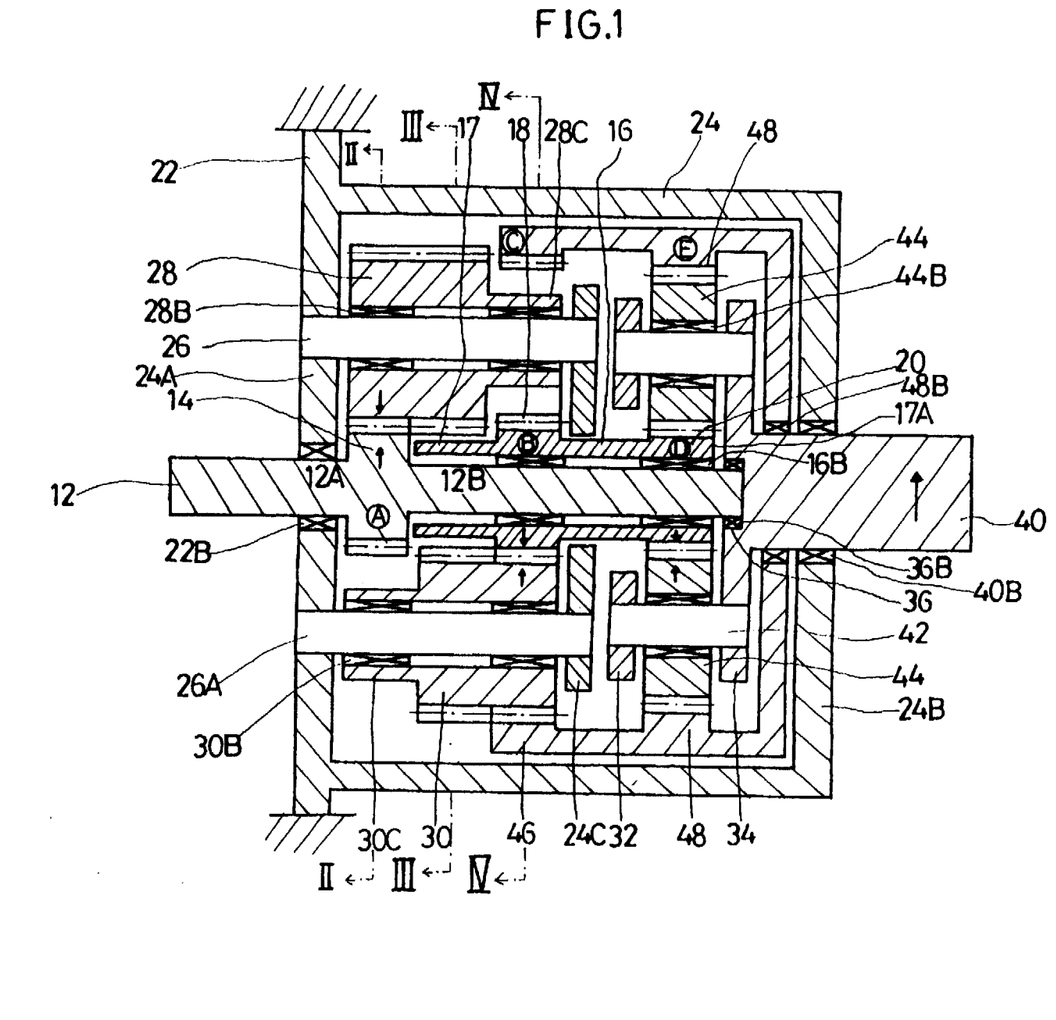
FIG. 1 is a sectional view of a reduction gear according to a first embodiment of the present invention.

As shown in the drawings, the inventive reduction gear has an input shaft 12 which is divided into a first part 12A integrally formed with an input sun gear 14, and a second part 12B on which a hollow shaft 16 is mounted coaxially with the input shaft 12. One end 17 of the hollow shaft 16 is disposed approximate to one side of the input sun gear 14. On the middle of the hollow shaft 16, a differential sun gear 18 is carried, and on the other end 17A of the hollow shaft 16, a planetary sun gear 20 is integrally mounted in a state where it is anguraly indexed from the differential sun gear 18.

The input shaft 12 is supported on a case or frame 24. A bearing 22b is carried on a locking plate 22A of the frame 24 at a front side of the input sun gear 14. An output bearing 40B is mounted on a locking plate 22B The frame 24 has a cylindrical-shape. The output shaft 40 is supported by the bearing 40B. A bearing 36B is carried on a groove formed on an inner end of the case of the output shaft, such that the bearing 36B can support and allow the inner end of the case of the input shaft 12 to coaxially rotate with the output shaft.

A plurality of locking pins 26, 26', 26A and 26A' are mounted on the locking plate 24A, where the input shaft is supported, at a predetermined distance. Each of the locking pins is coupled at its one end with a locking ring 24C having a donut-shape so that it can be securely fixed.

Each of the locking pins 26 and 26A' is provided with first differential gears 28 and 28' while each of the locking pins 26A and 26A' is provided with second differential gears 30 and 30'. The first and second differential gears can freely rotate with respect to the locking pins 26, 26', 26A and 26A' by interposing bearings 28B therebetween, respectively. The differential gears are provided with concave portions 28C and 30C so that the first differential gears 28 and 28' can mesh with the input sun gear 14 and the second differential gears 30 and 30'. Each of the front-halves of the second differential gears 30 and 30' meshes with each of the rear sides of the first differential gears 28 and 28', respectively. A differential sun gear 18 meshes with rear-inner surface of the second differential gears 30 and 30'. The second differential gears mesh with the differential ring gear 46.

Figure 2:
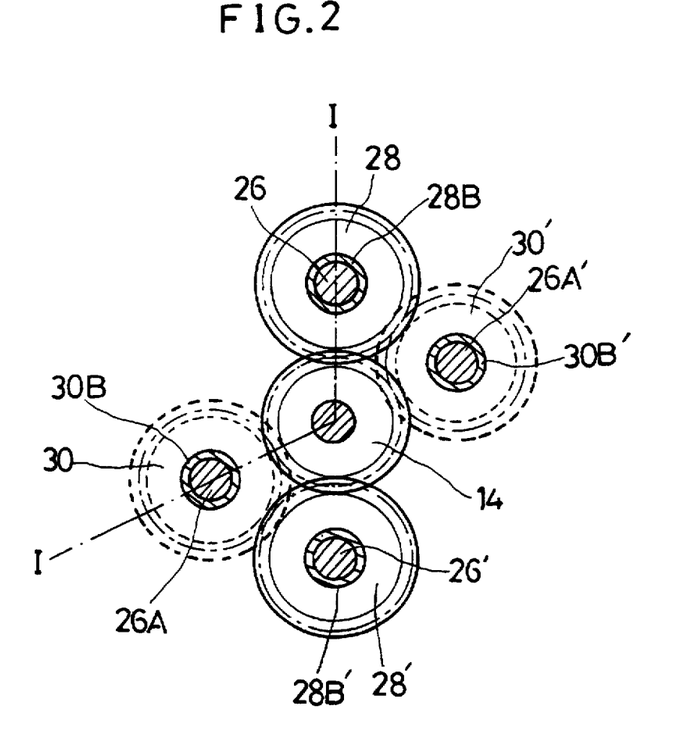
FIG. 2 is a sectional view taken along line II—II of FIG. 1.

The solid line in FIG. 2 shows that the gears mesh with each other. That is, the input sun gear 14 meshes with the first differential gears 28 and 28' while the second differential gears 30 and 30' depicted in a dotted-line do not mesh with the input sun gear 14.

Figure 3:
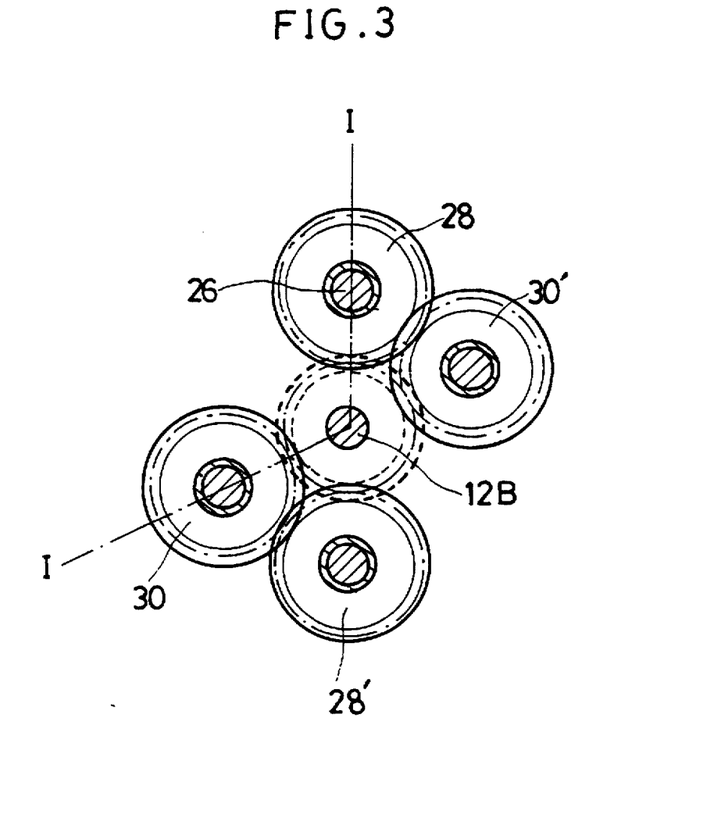
FIG. 3 is a sectional view taken along line III—III of FIG. 1.

In FIG. 3, the first differential gear 28 meshes with the second differential gear 30 rather than the input sun gear. The first differential gear 28' also meshes with the second differential gear 30' but not the input sun gear.

Figure 4:
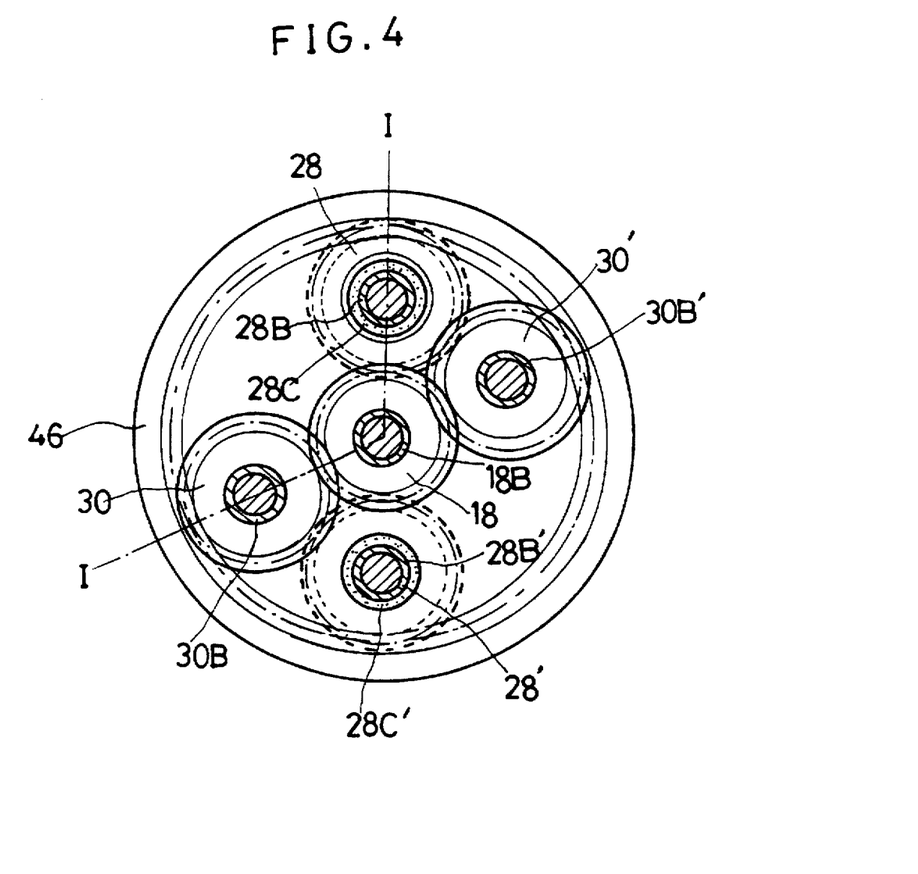
FIG. 4 is a sectional view taken along line IV—IV of FIG. 1.

In FIG. 4, the differential gear 18 meshes with the second differential gears 30 and 30' as well as the differential ring gear 46, but does not mesh with the first differential gear.

There is provided a carrier 32 having a predetermined inner diameter on the second part 12B of the input shaft 12 and a carrier 34 integrally formed with the output shaft 40 having an inner diameter portion on which bearing 36B is disposed to allow for free rotation of the input shaft 12. The carriers 32 and 34 are connected to each other by a plurality of locking pins 42 so that they can be rotated together with each other. Planetary gears 44 meshing with the planetary sun gear 20 are rotatably inserted into the locking pins, interposing a bearing 44B therebetween.

In addition, there is provided a differential ring gear 46 meshing with an outer circumference of the second differential gear 30, and a planetary ring gear 48 integrally formed with the differential ring gear 45. The differential ring gears 46 and 48 are rotatably supported on the output shaft 40 by interposing a bearing 48B therebetween. Here, the locking pin 26 and the first differential gear 28 are disposed in one side as a first combination, and the locking pin 26' and the first differential gear 28' are disposed in opposite side as a second combination. The locking pin 26A and the second differential gear 30 is formed as a third combination, and this third combination meshes with the first combination. The locking pin 26A' and the second differential gear 30' are formed as a fourth combination, and this fourth combination meshes with the second combination.

As described above, the compound differential and planetary gear set has a structure which can remarkably reduce the rotational speed of the input shaft. That is, since the gears mesh with each other in compound state, the inputted power is dispensed to each gear and carrier and then combined again to be transmitted to the output shaft so that impact caused by overload of the output shaft can be absorbed and the relatively large load can be smoothly transmitted.

The power transmission flow in the above described reduction gear is as follows:

That is, when the rotational force is inputted to a drive shaft to the input shaft 12, the input sun gear 14 which is integrally formed on the input shaft 12 rotates in the same direction as that of the input shaft 12. Therefore, the first differential gear 28 meshing with the input sun gear 14 rotates in the opposite direction of the input sun gear 14 about the locking pin 26, and the second differential gear 30' meshing with the first differential gear 28 is primarily reduced and rotates in the same direction as that of the input sun gear 14. Next, the differential ring gear 46 meshing with the outer circumference of the second differential gear 30' rotates in the same direction as that of the second differential gear 30', and the differential sun gear meshing with the inner circumference of the second differential gear 30' rotates in an opposite direction to that of the second differential gear 30'.

Here, it can be noted that the power inputted through the input shaft 12 is dispensed to the differential ring gear 46 and the differential sun gear 18, thereby achieving the primarily reduction effect.

Next, the planetary sun gear 22 integrally formed with the differential sun gear 18 rotates in the same direction as that of the differential sun gear 18, and the planetary gear 44 meshing with the inner circumference of the planetary sun gear 20 rotates in the same direction as that of the input shaft 12. In addition, the planetary ring gear 48 integrally formed with the differential ring gear 45 comes to rotate in the same direction as that of the differential ring gear 46 and rotates the planetary gear 44 meshing therewith in the same direction as that of the input shaft 12. In this state, the powers dispensed as described above are combined again at the planetary gear 44 and rotate the carriers 32 and 34 in the same direction as that of the planetary ring gear 46. Therefore, the output shaft 40 integrally formed with the carrier 34 is rotated in the same speed and direction as those of the carrier 34.

At this point, the revolution speed of the carriers 32 and 34 in the same direction as that of the input shaft 12 is reduced by the rotational speed of the planetary sun gear 20 in an opposite direction to that of the input shaft 12.

As described above, the rotational force inputted through the input shaft 12 is dispensed in two ways, and during the course of combining the dispensed rotational force again, the difference between the revolution speed and the rotational speed rotates the output shaft 40.

On the one hand, when the number of gear teeth used for the present invention is appropriately regulated, the rotational number of the output shaft can be varied. At this point, the reduction gear ratio can be obtained according to the following equation.

$$N=\{A/B\}\times[(B/C)\times\{E(D+E)\}-\{D(D+E)\}]$$

Where N indicates the rotational number of the output shaft;

A indicates the number of teeth of the input sun gear 14;
B indicates the number of teeth of the differential sun gear 18;
C indicates the number of teeth of the differential ring gear 46;
D indicates the number of teeth of the planetary sun gear 20; and
E indicates the number of teeth of the planetary ring gear 48.

Therefore, if the number of teeth of each gear is noted, the reduction gear ratio can be obtained according to the above equation.

If there is a need of rotating the output shaft in a direction opposite to that of the input shaft, B and C are replaced with D and E to achieve this.

The following table shows as a reference that the number of teeth of each gear and the reduction gear ratio (i.e., the rotational number of the output shaft: the rotational number of the input shaft) according to the number of teeth.

TABLE

|   | A | B | C | D | E | Reduction Gear Ratio |
|---|---|---|---|---|---|---|
| 1 | 16 | 16 | 54 | 15 | 51 | 1:594 |
| 2 | 17 | 17 | 53 | 16 | 50 | 1:1,794 |
| 3 | 19 | 19 | 59 | 18 | 56 | 1:2,183 |
| 4 | 18 | 18 | 88 | 19 | 93 | 1:4,928 |

Figure 5:
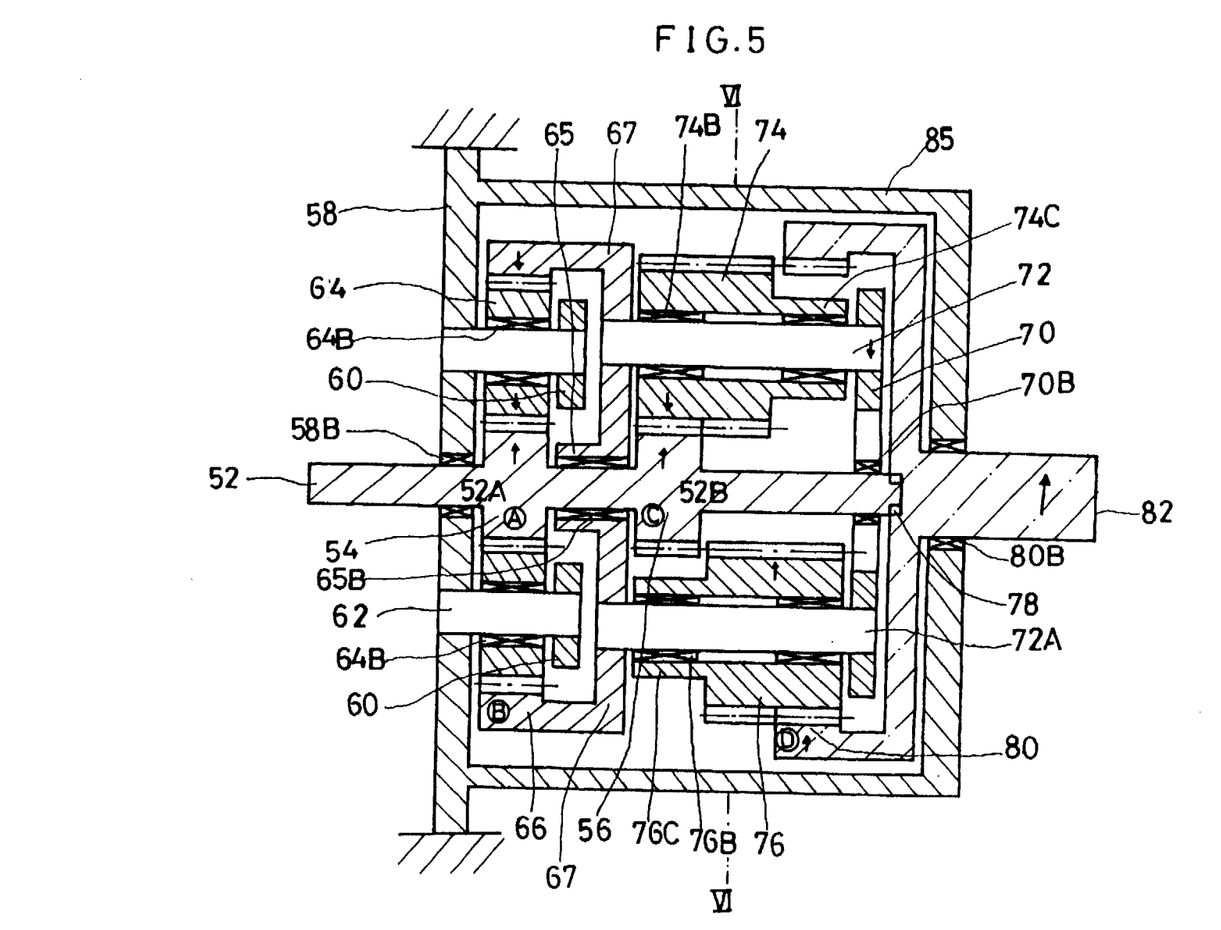
FIG. 5 is a sectional view of a reduction gear according to a second embodiment of the present invention.
Figure 6:
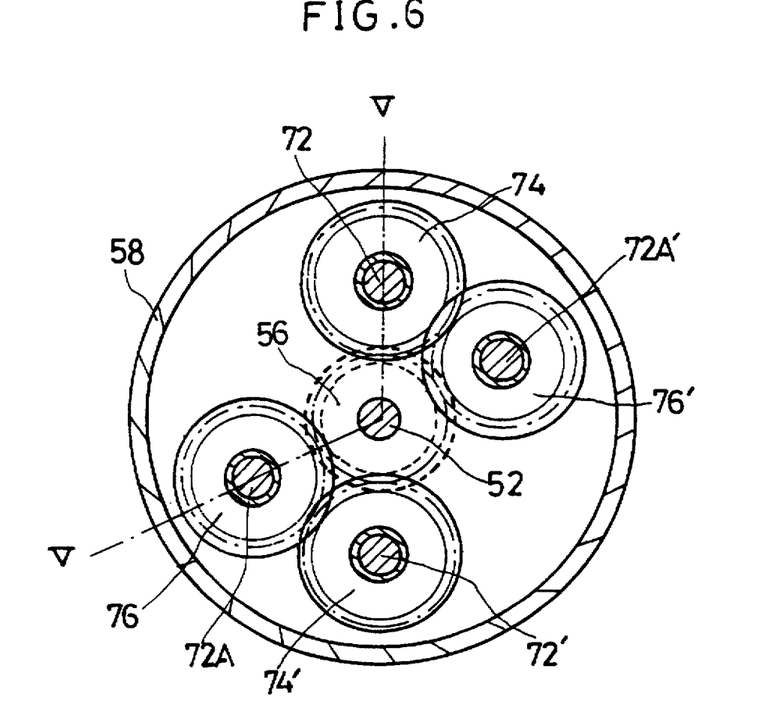
FIG. 6 is a sectional view taken along line VI—VI of FIG. 5.

Referring to FIGS. 5 and 6, there are shown a sectional view illustrating a reduction gear according to a second embodiment of the present invention.

In this embodiment, an input shaft 52 is divided into a first part 52A on which a first sun gear 54 is formed and a second part 52B on which a second sun gear 56 is integrally mounted. A locking plate 60 through which the input shaft passes is mounted on the front side of the first sun gear 54, while interposing a bearing 55B therebetween. A locking plate 60 having a predetermined inner diameter is mounted on a rear side of the first sun gear. A plurality of locking pins 62 are inserted between the locking plates 58 and 60.

A plurality of planetary gears 64 meshing with an outer circumference of the first sun gear 54 are rotatably mounted on each of the locking pins 62. Bearings 64B are interposed between each of the locking pins 62 and the planetary gears 64. The planetary gears 64 further mesh with an inner circumference of a ring gear 66. The ring gear 66 is integrally formed with a carrier 70 having a hollow cylinder part 65. The carrier 70 is integrally coupled to a carrier 70 by a locking pin 72, and is mounted between the sun gears 54 and 66. A bearing 65B is disposed between the hollow cylindrical portion 65 and the input shaft 52 to allow for free rotation thereof.

A carrier 70 is rotatably carried on one end of the second part 52B of the input shaft 52 by interposing a bearing 30B therebetween. A plurality of locking pins 72 and 72A are fixed between the ring gear 56 and the carrier 70 so that the ring gear 56 and the carrier 70 can rotate in a body.

First differential gears 74 and 74' are mounts on the locking pins 72 and 72', respectively. Each of the first differential gear has a plurality of concave portions 74C disposed at a predetermined distance and meshes with the second sun gear 56. Second differential gears 76 and 76' each having also a plurality of concave portions 76c are mounded on the locking pins 72A and 72A', respectively. These second differential gears 76 and 76' do not mesh with the second sun gear 56. The locking pins 72 and 72A are provided with bearings 74B and 76B, respectively, so teat the first and second differential gears 74 and 76 can freely rotate.

A second sun gear meshes with a front-half inner surface of the first differential gear 74, and a front-half of the second differential gear 76 meshes with the rear side of the first differential gear 74. As shown in FIG. 6, the first differential gear 74 meshes with the second differential gear 76', and the first differential gear 74' meshes with the second differential gear 76. The dotted-line indicates the second gear 56.

An output ring gear 80 integrally formed with the output shaft 42 and having an inner diameter portion 78 meshes with the rear-half outer surface of the second differential gear 76. A bearing 80B is inserted into the inner diameter portion 78 so that the output ring gear 80 can freely rotate with respect to the second part 52B of the input shaft 52.

Here, the locking pin 72, the first differential gear 74, and the concave portion 74C constitute a first differential gear set. The locking pin 72A, the second differential gear 75 and the concave portion 76C constitute a second differential gear set.

The power transmission flow in the above described reduction gear is as follows:

Input shaft 52 →

→ Output ring gear and Output shaft

When the rotational force is inputted from the engine to the input shaft 52, the first sun gear 54 integrally formed with the input shaft rotates in the same direction as that of the input shaft. Therefore, the planetary gear 64 meshing with the first sun gear 54 rotates about the locking pin 62 in an opposite direction to that of the first sun gear 54, and the ring gear 66 meshing with the planetary gear 64 is primarily reduced and rotated in the same direction as that of the planetary gear 64 according to the number of teeth of each gear 54, 64, 66 due to the locking state of the locking plates 58 and 60. As a result, the carrier 70 integrally formed with the ring gear 66 is also rotated in the same direction.

Next, due to the rotation of the second sun gear 56 integrally formed with the input shaft 52, the first differential gear 74 integrally formed with the second sun gear rotates in an opposite direction to that of the second sun gear 56, and the second differential gear 76 meshing with the first differential gear 74 rotates in an opposite direction to that of the first differential gear 74. The output shaft 82 integral with the output ring gear 80 rotates in the same direction as that of the output ring gear 80.

In other word, the rotational force of the second differential gear 76 which rotates in the same direction as that of the input shaft 52 is reduced by the rotational force of the carrier which rotates in an opposite direction to that of the input shaft 52, and then rotates the output ring gear 80.

As described above, the rotational speed inputted through the input shaft 52 is transmitted while being divided into two trains. That is, in a first train, the rotation speed is primarily reduced at the ring gear 60 through the first sun gear and is then transmitted to the carrier 70. In the second train, the rotation speed is transmitted to the second differential gear 76 through the second sun gear 56.

Difference of the rotational speeds passing through the trains are combined again at the output ring gear 80, thereby rotating the output shaft 82 at a predetermined reduction gear ratio.

Here, the reduction gear ratio of the output shaft 82 is obtained according to the following equation.

$$N = (C/D) - \{(1-C/D)\} \times (A/B)$$

Where N indicates the rotational number of the output shaft;

A indicates the number of teeth of the first sun gear 14;

B indicates the number of teeth of the ring gear 26;

C indicates the number of teeth of the second ring gear 16; and

D indicates the number of teeth of the output ring gear 40.

The following table shows as a reference that the number of teeth of each gear and the reduction gear ratio (i.e., the rotational number of the output shaft: the rotational number of the input shaft) according to the number of teeth.

TABLE

|   | A | B | C | D | Reduction Gear Ratio |
|---|----|----|----|----|---------------------|
| 1 | 15 | 51 | 16 | 66 | 51:1 |
| 2 | 16 | 48 | 15 | 59 | 177:1 |
| 3 | 15 | 51 | 15 | 65 | 221:1 |
| 4 | 15 | 49 | 16 | 68 | 833:1 |

As described above, the reduction gear according to the present invention can obtain a relatively large reduction gear ratio only by changing the number of gear teeth without increasing the number of gears, thereby simplifying the structure thereof.

While the invention has been described in connection with what is presently considered to be the most practical an preferred embodiments, it is to be understood that the invention is not limited to the disclosed embodiments, but, on the contrary, it is intended to cover various modifications and equivalent methods included within the spirit and scope of the appended claims.

What is claimed is:

1. A reduction gear for reducing the rotational speed transmitted from an input shaft to an output shaft, comprising:
    a frame;
    an input shaft rotatably supported on the frame and rotating by receiving driving force;
    an output shaft rotatably supported on the frame in the same axis as that of the input shaft, the output shaft being connected to one end of the input shaft and designed to independently rotate from the input shaft;
    an input sun gear integrally formed with the input shaft;
    a first differential gear supported on a locking pin fixed on the frame and meshing with the input sun gear;
    a second differential gear supported on a locking pin fixed on the frame and meshing with the first differential gear;
    a hollow shaft coaxially mounted on the input shaft between the output shaft and the input sun gear;
    a differential sun gear integrally formed with the hollow shaft and meshing the second differential gear;
    a differential ring gear rotatably mounted around the output shaft and meshing with the second differential gear;
    a planetary ring gear integrally formed with the differential ring gear;
    a planetary sun gear integrally formed with the hollow shaft and disposed between the differential sun gear and the output shaft;
    more than one planetary gear simultaneously meshing with the planetary sun gear and the planetary ring gear; and
    a carrier connecting an shaft of the planetary gear to the output shaft.

2. A reduction gear according to claim 1, wherein two first differential gears and two second differential gears are disposed symmetrically with respect to the input shaft, and three planetary gears are mounted on the carrier.

3. A reduction gear for reducing the rotational speed transmitted from an input shaft to an output shaft, comprising:
    a frame;
    an input shaft rotatably supported on the frame and rotating by receiving driving force;
    an output shaft rotatably supported on the frame in the same axis as that of the input shaft, the output shaft being connected to one end of the input shaft and designed to independently rotate from the input shaft;
    first and second sun gears integrally carried on the input shaft;
    at least one planetary gear rotatably supported on a locking pin fixed on the frame and meshing with the first sun gear;
    a carrier having a ring gear meshing with the planetary gear;
    a first differential gear rotatably supported on a locking pin fixed on the carrier and meshing with the second sun gear;
    a second differential gear rotatably supported on a locking pin fixed on the carrier and meshing with the first differential gear; and
    an output ring gear meshing with the second differential gear and integrally formed on the output shaft.

4. A reduction gear according to claim 1, wherein two first differential gears and two second differential gears are disposed symmetrically with respect to the input shaft, and two planetary gears are mounted on the carrier.

* * * * *